July 28, 1925.
E. M. BAILEY
HEADLIGHT CONTROLLING DEVICE
Filed Nov. 14, 1922
1,547,490
2 Sheets-Sheet 1
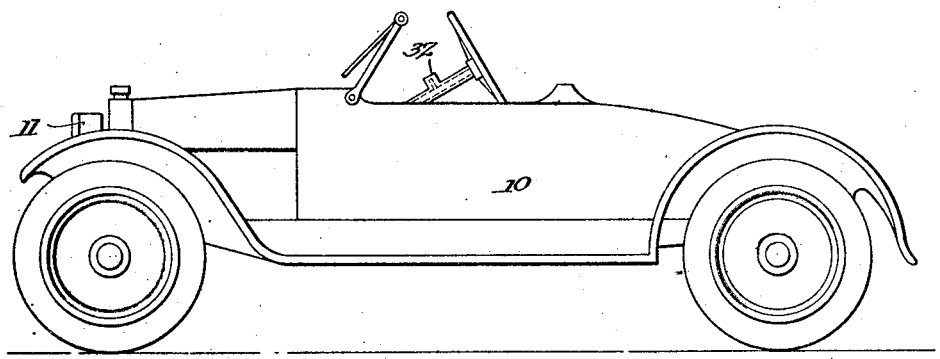
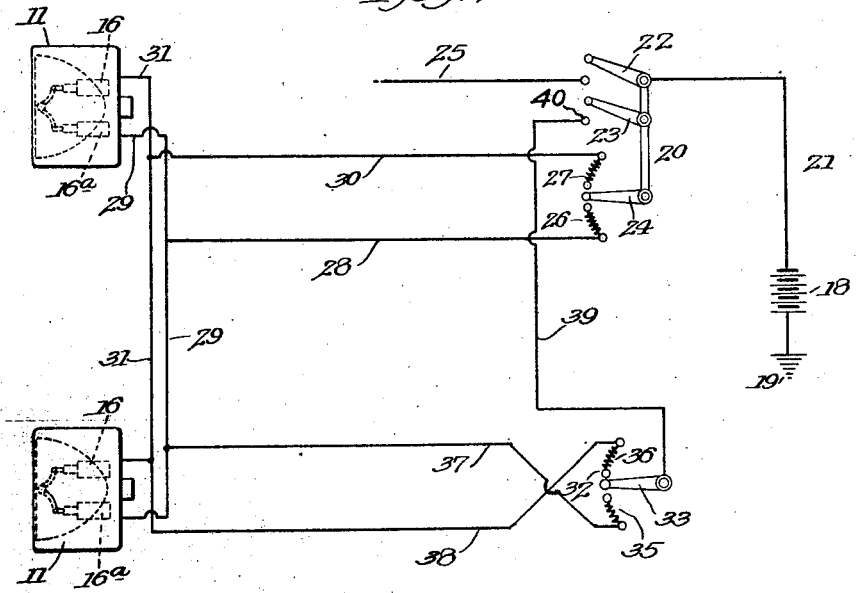

July 28, 1925.

E. M. BAILEY

HEADLIGHT CONTROLLING DEVICE

Filed Nov. 14, 1922  2 Sheets-Sheet 2

1,547,490

E. M. Bailey
INVENTOR

BY Victor J. Evans
ATTORNEY

WITNESS:

Patented July 28, 1925.

1,547,490

UNITED STATES PATENT OFFICE.

ERNEST M. BAILEY, OF SOUTH BOSTON, VIRGINIA.

HEADLIGHT-CONTROLLING DEVICE.

Application filed November 14, 1922. Serial No. 600,906.

*To all whom it may concern:*

Be it known that I, ERNEST M. BAILEY, a citizen of the United States, residing at South Boston, in the county of Halifax and State of Virginia, have invented new and useful Improvements in Headlight-Controlling Devices, of which the following is a specification.

This invention relates to improvements in head lamps for automobiles and has for an object the provision of manually operated means whereby the reflectors of the lamps may be moved laterally, so as to direct the rays of light to one side of a roadway away from an approaching vehicle and thus prevent confusing and dazzling the approaching driver and at the same time benefiting the driver of the automobile to which the lamps are attached, by clearly illuminating the edge of the roadway.

Another object of the invention is the provision of automatically operated means controlled by the steering mechanism of the automobile for moving the lamp reflectors in the manner stated, so that the rays of light will always be projected ahead in the direction of travel, the degree of operation of the lamp reflectors, or the length of the arc in which they are swung will be regulated by the arc in which the automobile is being turned.

With the above and other objects in view, the invention further includes the following novel features and details of construction, to be hereinafter more fully described, illustrated in the accompanying drawings and pointed out in the appended claims.

In the drawings:—

Figure 1 is a side elevation of an automobile with the invention applied thereto.

Figure 2 is a diagrammatic view of the wiring.

Figure 3:
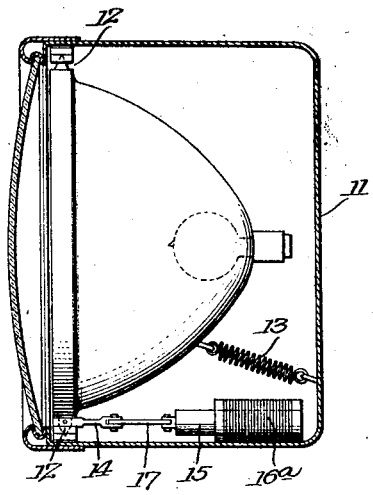
Figure 3 is a vertical longitudinal view through one of the headlamps.
Figure 4:
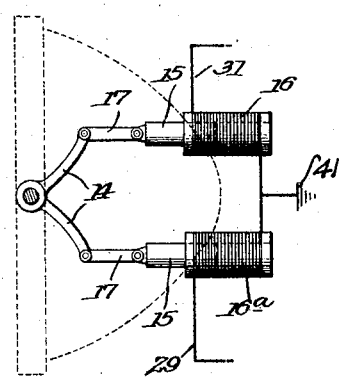
Figure 4 is a top plan view of the device mounted in the headlight with the reflector in dotted lines.

Referring in detail to the drawings, wherein like characters of reference denote corresponding parts, the automobile which is indicated at 10 has mounted thereon head lamps 11, the reflectors of the latter being pivotally mounted as shown at 12, so as to permit of horizontal swinging movement. The rays of light may thus be projected to either side of the automobile to illuminate either side of the roadway.

The reflectors are normally centered, that is, they are normally directed straight ahead and in order to hold them in this position and at the same time permit of their being pivotally moved when desired, there is connected to each reflector a spring 13. Also connected to each reflector, or to one of the pivots 12 upon which the reflectors swing, are oppositely extending arms 14 and these arms are connected to the cores 15 of solenoids 16 and 16ª by means of links 17, there being a pair of solenoids for each reflector. These solenoids are adapted to be selectively energized and are so connected in an electric circuit that the left hand solenoids of each reflector may be simultaneously operated so as to simultaneously swing the lamp reflectors toward the left, while the right hand solenoids may likewise simultaneously operate to simultaneously swing the reflectors in an opposite direction. For this purpose the solenoids are included in a circuit with a battery 18, one terminal of which is grounded as at 19, while the opposite terminal is connected to a switch 20 by means of a conductor 21. This switch includes a plurality of controlling levers indicated at 22, 23 and 24. The first mentioned lever is connected in a circuit 25 with the reflector. The controlling lever 24 or switch arm forms a part of a rheostat switch which includes coils 26 and 27, the former being connected to both of the solenoids 16ª by means of conductors 28 and 29. The coil 27 is connected to the solenoids 16 by means of conductors 30 and 31.

Figure 5:
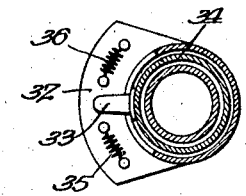
Figure 5 is a detail sectional view of the switch.

Included in circuit with the solenoids is a second rheostat switch 32, whose switch arm 33 is operated by the steering mechanism of the automobile as clearly shown at 34 in Figure 5 of the drawings. The switch arm 33 is capable of movement in opposite directions, its direction of movement being controlled by the direction of movement of the steering mechanism. The rheostat switch 32 also includes separate coils 35 and 36, the former being connected to the conductor 29 by means of a conductor 37, while the latter is connected to the conductor 31 by means of a conductor 38. The switch arm 33 is connected by means of a conductor 39 to a contact 40 which is adapted to be engaged by the switch arm 23.

Should it be desirable to swing the lamp reflectors laterally, to either side of the roadway, for example, to the right when approaching a vhicle traveling in an opposite direction so as to direct the rays of light away from the eyes of the approaching driver, the switch arm 24 may be manually moved to the right to engage the resistance coil 27, whereupon current will flow from the battery 18 through the conductor 21, the arm 24, the coil 27, the conductor 30, the conductor 31. All of the solenoids are grounded as indicated at 41 so that current from the solenoids 16 will return to the battery through the grounds 41 and 19. The solenoids 16 will then be energized to actuate the cores 15 and move the lamp reflectors pivotally to the right, the degree of movement depending upon the amount of the resistance 27 cut out by the position of the switch arm 24. In order to swing the lamp reflectors in an opposite direction or toward the left, the switch arm is engaged with the resistance coil 26 of the rheostat switch, so that the solenoids 16$^a$ will be energized, as will be plainly seen.

One of the novel features of the invention resides in means for automatically swinging the head lamp reflectors, the said means being controlled by the steering mechanism of the automobile so that the rays of light will always be directed in the direction of travel. For this purpose the second rheostat switch 32 is operated by the means 34 disclosed in Figure 5 of the drawings and when the steering mechanism is operated to turn the automobile to the right, the switch arm 33 will engage the coil 36 of the rheostat switch 32, so that current will flow from the battery 18 through the conductor 21, the switch arm 23, (which is in closed position) the conductor 39, the switch arm 33, the coil 36, the conductor 38, the conductor 31 to the solenoids 16, so that the cores 15 of these solenoids will be operated. Current will return to the battery through the grounds 41 and 19. As the amount of resistance of the coil 36 which is cut out is regulated by the degree of the arc in which the automomile is being turned, the strength of the current passing through the solenoids 16 will be controlled, so that the degree of movement of the lamp reflectors 11 will be likewise controlled.

The invention is susceptible of various changes in its form, proportions and minor details of construction and the right is herein reserved to make such changes as properly fall within the scope of the appended claims.

Having described the invention what is claimed is:—

1. A head-light controlling device of the character described including a pair of centrally pivotally mounted reflectors arranged within the head lamps of an automobile, a pair of solenoids arranged within each head lamp and having pivotally associated means connected with the lower pivotal point of the reflectors, means included in circuit with the source of current and head lamps for illuminating the same, a manually operated switch arm included in circuit therein in order to move the reflectors to either side within the head lamps, and automatically operated switching means included within the steering post of the vehicle in order that the reflectors may be moved laterally with respect to the turnings of the steering post.

2. A head light controlling device of the character described including a pair of pivotally mounted centrally positioned reflectors arranged for lateral movement within the head lamps, retractile means included upon the outer face of each reflector and connected with the lamp casing, for centering the reflectors therein, spaced pairs of solenoids arranged upon the lower and inner sides of the lamp casings, pairs of pivotally associated link members having their outer end portions fixed to the lower pivotal point of the reflectors, a manually operated switch included in circuit with a source of current and the head lamp for illuminating the same, a manually operated switch included in circuit therewith for selectively turning the reflectors laterally within the head lamps and an automatically operated switch arm included on the steering post of the automobile whereby upon the opposite turning of the steering wheel the automatically operated switch arm included therein will selectively engage any one of a pair of spaced contacts arranged therein and included in circuit with the solenoids arranged within the head lamps in order to selectively turn the reflectors either to the right or left within the head lamps.

In testimony whereof I affix my signature.

ERNEST M. BAILEY.